United States Patent
Kim et al.

(10) Patent No.: US 10,216,409 B2
(45) Date of Patent: Feb. 26, 2019

(54) DISPLAY APPARATUS AND USER INTERFACE PROVIDING METHOD THEREOF

(71) Applicant: SAMSUNG ELECTRONICS CO., LTD., Suwon-si (KR)

(72) Inventors: Min-jin Kim, Pyeongtaek-si (KR); Byuk-sun Kim, Seoul (KR); Sung-gook Kim, Seoul (KR); Yong-deok Kim, Anyan-si (KR); Chang-soo Noh, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 363 days.

(21) Appl. No.: 14/527,339

(22) Filed: Oct. 29, 2014

(65) Prior Publication Data

US 2015/0121286 A1 Apr. 30, 2015

(30) Foreign Application Priority Data

Oct. 30, 2013 (KR) .................. 10-2013-0129835

(51) Int. Cl.
*G06F 3/0488* (2013.01)
*G06F 3/0484* (2013.01)
*G06F 3/0482* (2013.01)

(52) U.S. Cl.
CPC ........ *G06F 3/04886* (2013.01); *G06F 3/0482* (2013.01); *G06F 3/04842* (2013.01)

(58) Field of Classification Search
CPC . G06F 3/04886; G06F 3/04842; G06F 3/0482
See application file for complete search history.

(56) References Cited

U.S. PATENT DOCUMENTS 5,706,450 A * 1/1998 Shaiman ............... G06F 3/0236
  715/210
6,307,548 B1 10/2001 Flinchem et al.
(Continued)

FOREIGN PATENT DOCUMENTS

CN 1379309 A 11/2002
CN 101290555 A 10/2008
(Continued)

OTHER PUBLICATIONS

Notice of Allowance dated Oct. 23, 2015, issued by the United States Patent and Trademark Office in U.S. Appl. No. 13/753,737.
(Continued)

*Primary Examiner* — Kevin L Young
*Assistant Examiner* — Parmanand D Patel
(74) *Attorney, Agent, or Firm* — Sughrue Mion, PLLC

(57) ABSTRACT

A method for providing a user interface (UI) includes displaying a character input UI, receiving a command to select a specific character on the character input UI, determining a character input mode from among a recommended character input mode and an accent mark character input mode based on the command, and displaying at least one of a first character input UI and a second character input UI according to the determined character input mode, wherein the first character input UI comprises recommended character items and the second character input UI comprises accent mark character items.

18 Claims, 18 Drawing Sheets

(56) References Cited

U.S. PATENT DOCUMENTS

| | | |
|---|---|---|
| 6,445,934 B1 | 9/2002 | Khazaka |
| 7,443,316 B2 | 10/2008 | Lim |
| 7,932,839 B2 | 4/2011 | Ko et al. |
| 8,223,040 B2 | 7/2012 | Ko et al. |
| 8,296,680 B2 | 10/2012 | Griffin et al. |
| 9,092,134 B2 | 7/2015 | Figura |
| 9,285,953 B2 | 3/2016 | Kim et al. |
| 2002/0183100 A1 | 12/2002 | Parker |
| 2003/0110402 A1* | 6/2003 | Park .................... G06F 3/0233 726/18 |
| 2003/0237055 A1 | 12/2003 | Lange et al. |
| 2006/0053387 A1* | 3/2006 | Ording ................ G06F 3/04883 715/773 |
| 2007/0054719 A1 | 3/2007 | Ohara et al. |
| 2007/0075978 A1 | 4/2007 | Chung |
| 2007/0126705 A1 | 6/2007 | Ko et al. |
| 2007/0216659 A1 | 9/2007 | Amineh |
| 2008/0167858 A1 | 7/2008 | Christie et al. |
| 2008/0180403 A1 | 7/2008 | Park et al. |
| 2009/0058823 A1* | 3/2009 | Kocienda ............. G06F 3/0236 345/173 |
| 2010/0088087 A1* | 4/2010 | Spjuth ................. G06F 3/0233 704/9 |
| 2010/0225599 A1 | 9/2010 | Danielsson et al. |
| 2011/0099506 A1* | 4/2011 | Gargi .................. G06F 3/0234 715/773 |
| 2011/0119623 A1 | 5/2011 | Kim |
| 2011/0148787 A1 | 6/2011 | Kiim |
| 2011/0169744 A1 | 7/2011 | Ko et al. |
| 2012/0047454 A1 | 2/2012 | Harte |
| 2012/0206366 A1* | 8/2012 | Vandeputte .......... G06F 3/0236 345/169 |
| 2012/0254786 A1 | 10/2012 | Colley |
| 2013/0021250 A1 | 1/2013 | Griffin et al. |
| 2013/0125037 A1 | 5/2013 | Pasquero et al. |
| 2013/0321267 A1* | 12/2013 | Bhatti .................. G06F 3/0237 345/157 |
| 2014/0115538 A1 | 4/2014 | Kim et al. |

FOREIGN PATENT DOCUMENTS

| | | |
|---|---|---|
| DE | 202013100128 U1 | 4/2013 |
| EP | 1953623 A1 | 8/2008 |
| GB | 2 373 907 B | 4/2005 |
| JP | 2005-32189 A | 2/2005 |
| JP | 2006-293797 A | 10/2006 |
| JP | 2006-302318 A | 11/2006 |
| JP | 2010-165226 A | 7/2010 |
| JP | 2010-198646 A | 9/2010 |
| JP | 2010-237973 A | 10/2010 |
| JP | 2011-210149 A | 10/2011 |
| KR | 2002-0027063 A | 4/2002 |
| KR | 10-0552085 B1 | 2/2006 |
| KR | 10-2011-0054598 A | 5/2011 |
| KR | 10-2012-0063407 A | 6/2012 |
| RU | 2418376 C2 | 5/2011 |
| TW | 200713060 A | 4/2007 |
| WO | 2007/047188 A2 | 4/2007 |
| WO | 2009/034220 A1 | 3/2009 |
| WO | 2012/076743 A1 | 6/2012 |
| WO | WO2012076743 * | 6/2012 |

OTHER PUBLICATIONS

Communication dated Jan. 4, 2016, issued by the European Patent Office in European Application No. 13153267.3.
"Turn Off Autocomplete for Input", CSS-Tricks, May 20, 2010, 17 pages, URL: http://css-tricks.com/snippets/html/autocomplete-off/.
Search Report, Issued by the International Searching Authority, dated Nov. 18, 2014, in counterpart International Application No. PCT/KR2014/007089.
Written Opinion, Issued by the International Searching Authority, dated Nov. 18, 2014, in counterpart International Application No. PCT/KR2014/007089.
Communication, Issued by the United States Patent and Trademark Office, dated Jan. 8, 2015, In counterpart U.S. Appl. No. 13/753,737.
Communication dated Mar. 25, 2015 by the European Patent Office in related Application No. 13153267.3.
Communication dated Mar. 17, 2016 issued by The State Intellectual Property Office of P.R. China in counterpart Chinese Patent Application No. 201310041595.0.
USPTO Office Action dated Jul. 16, 2015 issued in co-pending U.S. Appl. No. 13/753,737.
Communication dated Mar. 18, 2014 issued by the European Patent Office in counterpart European Patent Application No. 13 153 267.3.
Communication dated Aug. 4, 2014 issued by the European Patent Office in counterpart European Patent Application No. 13 153 267.3.
Communication dated Mar. 6, 2014 issued by the European Patent Office in counterpart European Patent Application No. 13 153 267.3.
Communication dated Jan. 28, 2014 issued by the Japanese Patent Office in counterpart Japanese Patent Application No. 2013-070556.
Communication dated Mar. 15, 2013 issued by the Korean Intellectual Property Office in counterpart Korean Patent Application No. 10-2012-0116065.
Search Report dated Jul. 30, 2013 issued by the International Searching Authority in counterpart International Patent Application No. PCT/KR2013/003239 (PCT/ISA/210).
Written Opinion dated Jul. 30, 2013 issued by the International Searching Authority in counterpart International Patent Application No. PCT/KR2013/003239 (PCT/ISA/237).
Communication dated Feb. 24, 2017, from the European Patent Office in counterpart European Application No. 14859062.3.
Communication dated Apr. 19, 2017, from the Russian Patent Office in counterpart application No. 2015118159/08.
Communication dated Sep. 11, 2017, issued by the European Patent Office in counterpart European Application No. 14859062.3.

\* cited by examiner

DISPLAY APPARATUS AND USER INTERFACE PROVIDING METHOD THEREOF

CROSS-REFERENCE TO RELATED APPLICATION

This application claims priority from Korean Patent Application No. 10-2013-0129835, filed on Oct. 30, 2013, in the Korean Intellectual Property Office, the disclosure of which is incorporated herein by reference in its entirety.

BACKGROUND

1. Field

Apparatuses and methods consistent with exemplary embodiments relate to displaying and inputting characters in a display apparatus, and more particularly, to providing a character-input user interface (UI) in a display apparatus to allow users to input characters with accent (or diacritic) marks, and a UI providing method thereof.

2. Description of the Related Art

Recent displays not only unilaterally provide functions or information to a user, but also respond to a user's request for a variety of functions or information. For example, televisions (TVs) may provide not only a broadcast reception function, but also a user interactive function such as application implementation or web browsing. Accordingly, the recent displays provide a character input UI (e.g., virtual keyboard) to receive a user's request.

Some languages such as French or Spanish include accent (or diacritic) marks added to the characters. In order to support inputting of such accent marks, virtual keyboards may use a method of mapping several characters to one key.

For example, a letter may be converted into a letter modified with an intended accent mark in a toggling manner, i.e., converted in response to a predetermined number of times of inputting the letter to be added with an accent mark on the virtual keyboard within a predetermined time. That is, a small sized device generally supports mapping a plurality of characters, e.g., A, B and C to one key, so that one of the plurality of characters, A, B and C is input when a user presses the key a predetermined number of times. However, when the number of letters mapped to the key increases, the user may experience inconvenience since the user needs to press the corresponding key a plurality of times to input an intended character.

For example, during a process of inputting French, the user may convert alphabet 'e' into 'e' by pressing 'e' on a keypad two times within a predetermined time, and then convert "'ë' into 'é' by pressing 'e' one more time. The above-explained method may cause a user to feel fatigued even when the user is familiar to using languages that have accent marks, because the user are not provided with information about the number of times required to press the key until the intended character is input.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a display apparatus configured to enable a user to input a character modified with an accent (or diacritic) mark by providing a variety of character input modes which require simpler user manipulation to operate, and a user interface (UI) providing method thereof.

According to an aspect of an exemplary embodiment, provided is a method for providing a user interface (UI), the method including: displaying a character input UI, receiving a command to select a specific character on the character input UI, determining a character input mode from among a recommended character input mode and an accent mark character input mode based on the command, and displaying at least one of a first character input UI and a second character input UI according to the determined character input mode, wherein the first character input UI comprises recommended character items and the second character input UI comprises accent mark character items.

The determining the character input mode from among the recommended character input mode and the accent mark character input mode may include determining the recommended character input mode as the character input mode in response to the command being input by successively inputting the specific character at least a preset number of times within a preset time period, and determining the accent mark character input mode as the character input mode in response to the command being input by inputting the specific character less than the preset number of times within the preset time period.

The method may further include, in response to a recommended character item being selected from the first character input UI displayed in the recommended character input mode, inputting a recommended character that corresponds to the selected recommended character item next to the specific character, and in response to an accent mark character item being selected from the second character input UI displayed in the accent mark character input mode, inputting an accent mark character that corresponds to the selected accent mark character item by replacing the specific character with the accent mark character.

The inputting the accent mark may include displaying a block graphic user interface (GUI) on the specific character input to an input window in the accent mark character input mode and with the block GUI being displayed, inputting the accent mark character that corresponds to the selected accent mark character item by replacing the specific character with the accent mark character.

The displaying the at least one of the first character input UI and the second character input UI may include, in response to a number of recommended characters or accent mark characters that correspond to the specific character being equal to or less than a preset number of items displayable on the first or the second character input UI, displaying at least one recommended character or accent mark character in the first or the second character input UI.

The displaying the at least one of the first character input UI and the second character input UI may include, in response to a number of recommended characters or accent mark characters that correspond to the specific character being greater than a preset number of items displayable on the first or the second character input UI, displaying a GUI indicating that at least one additional recommended character or accent mark character is not displayed in the first or the second character input UI.

The determining may include, in response to the specific character not supporting use of an accent mark, determining the character input mode to be the recommended character input mode, irrespective of the command.

The displaying the at least one of the first character input UI and the second character input UI may include displaying the at least one of the first and the second character input UIs in a manner of partially overlapping character items that are arranged adjacent to a character item corresponding to the specific character.

The method may additionally include, in response to the specific character being again selected within a preset time period in the recommended character input mode or the accent mark character input mode, changing the character input mode.

The displaying the at least one of the first character input UI and the second character input UI may include searching at least one recommended character for the specific character based on a possibility of being input next to the specific character using a dictionary database and a user database, the user database storing therein a record of words previously used by a user, and displaying the searched at least one recommended character.

According to an aspect of another exemplary embodiment, provided is a display apparatus including: a display configured to display character input user interface (UI), a user interface configured to receive a command to select a specific character on the character input UI, and a controller configured to determine a character input mode from among a recommended character input mode and an accent mark character input mode based on the command, and control that the display to display at least one of a first character input UI and a second character input UI according to the determined character input mode, wherein the first character input UI comprises recommended character items and the second character input UI comprises accent mark character items.

The controller may, in response to the command being input by successively inputting the specific character at least a preset number of times within a preset time period, determine the recommended character input mode as the character input mode, and in response to the command being input by inputting the specific character less than the preset number of times within the preset time period, determine the accent mark character input mode as the character input mode.

The controller may, in response to a recommended character item being selected from the first character input UI displayed in the recommended character input mode, input a recommended character that corresponds to the selected recommended character item next to the specific character, and in response to an accent mark character item being selected from the second character input UI displayed in the accent mark character input mode, input an accent mark character that corresponds to the selected accent mark character item by replacing the specific character with the accent mark character.

The controller may control the display to display a block graphic user interface (GUI) on the specific character input to an input window in the accent mark character input mode and with the block GUI being displayed, input the accent mark character that corresponds to the selected accent mark character item by replacing the specific character with the accent mark character.

The controller may, in response to a number of recommended characters or accent mark characters that correspond to the specific character being equal to or less than a preset number of items displayable on the first or the second character input UI, control the display to display at least one recommended character or accent mark character in the first or the second character input UI.

The controller may, in response to a number of recommended characters or accent mark characters that correspond to the specific character being greater than a preset number of items displayable on the first or the second character input UI, control the display to display a GUI indicating that at least one additional recommended character or accent mark character is not displayed in the first or the second character input UI.

The controller may, in response to the specific character not supporting use of an accent mark, determine the character input mode to be the recommended character input mode, irrespective of the command.

The first and the second character input UIs may be displayed in a manner of partially overlapping character items that are arranged adjacent to a character item corresponding to the specific character.

The controller may, in response to the specific character being again selected within a preset time period in the recommended character input mode or the accent mark character input mode, change the character input mode.

The display apparatus may further include a storage configured to store a dictionary database and a user database, the user database storing therein a record of words previously used by a user, wherein the controller may search at least one recommended character for the specific character based on a possibility of being input next to the specific character using the dictionary database and the user database, and control the display to display the searched at least one recommended character.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
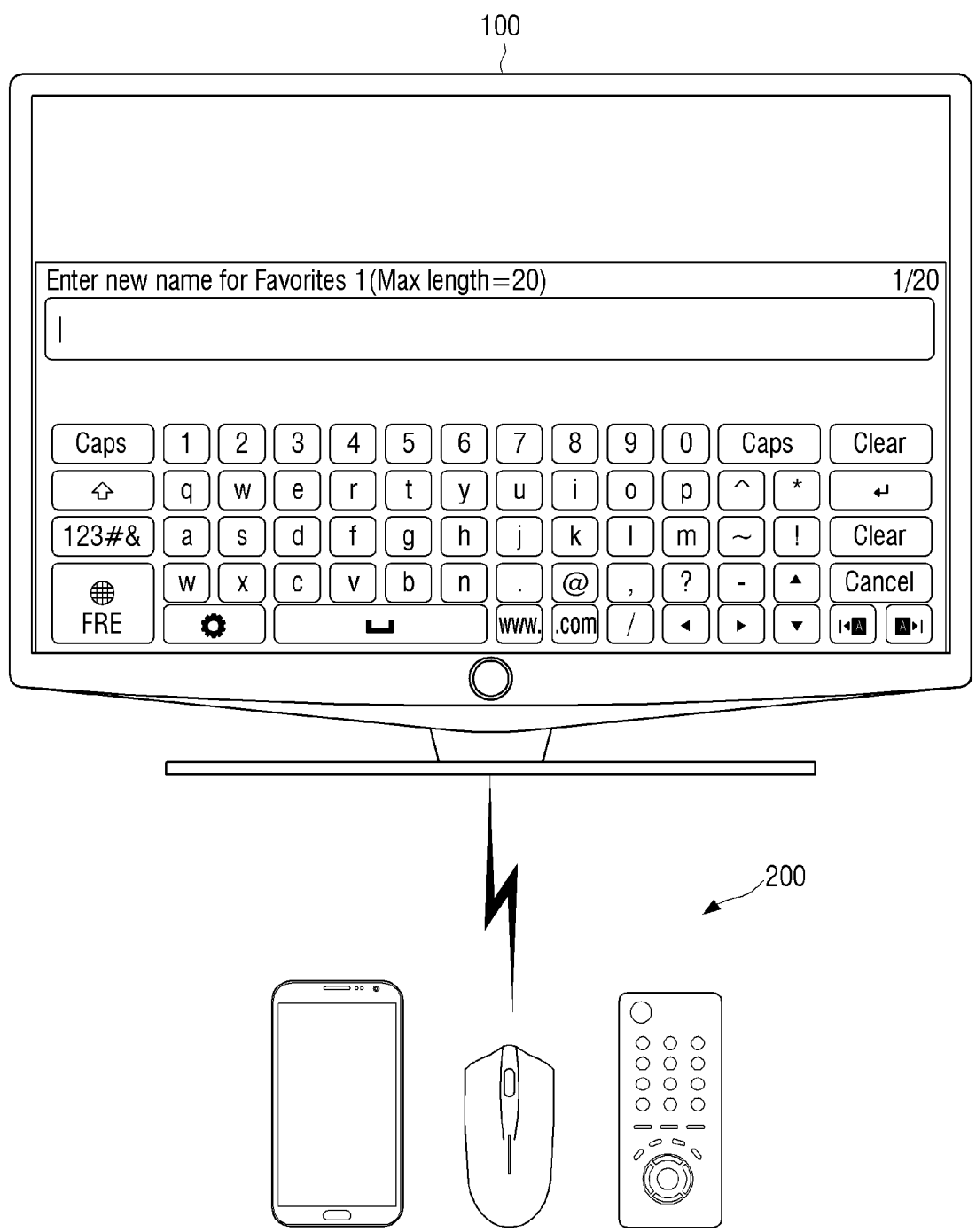
FIG. 1 is a view illustrating a display system according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the disclosure with unnecessary detail.

FIG. 1 is a view for explaining a display system according to an exemplary embodiment.

Referring to FIG. 1, a display system according to an exemplary embodiment includes a display apparatus 100 and a remote control apparatus 200.

The display apparatus 100 may be implemented as, for example, a digital television (TV), as illustrated in FIG. 1, but not limited thereto. Accordingly, the display apparatus 100 may be implemented in a variety of devices with a display function such as, for example, a personal computer (PC) monitor, a projector mobile phone, a tablet PC, a portable media player (PMP), a personal digital assistant (PDA), or a global positioning system (GPS). When the display apparatus 100 is implemented as a portable device, the display apparatus 100 may be imbedded with a touch screen to allow a user to execute a program with his or her finger or a pen (e.g., stylus pen). The display apparatus 100 will now be explained below with reference to an example where the display apparatus 100 is implemented as a digital TV.

The display apparatus 100, when implemented as a digital TV, may be controlled by a user motion, a voice or the remote control apparatus 200. The remote control apparatus 200 is provided to allow controlling the display apparatus 100 at a remote distance, and may receive a user command or transmit a control signal corresponding to the received user command to the display apparatus 100. For example, the remote control apparatus 200 may have a variety of configurations to detect a motion of the remote control apparatus 200 and transmit a corresponding signal, perceive a voice and transmit a corresponding signal, or transmit a signal corresponding to an incoming key. For example, the remote control apparatus 200 may be a remote controller or a mobile phone. The remote control apparatus 200 may include a motion sensor, a touch sensor or an optical joystick utilizing optical technology, a physical button (e.g., tact switch), a display screen, or a microphone.

The display apparatus 100 may provide a variety of user interface (UI) screens, in response to a user's request input through the remote control apparatus 200. Further, the display apparatus 100 may provide a variety of functions and information, in response to various types of user interactions on the UI screen.

The display apparatus 100 may provide a character input UI in accordance with a variety of events, which will be explained in greater detail below with reference to a block diagram of the display apparatus 100.

Figure 2A:
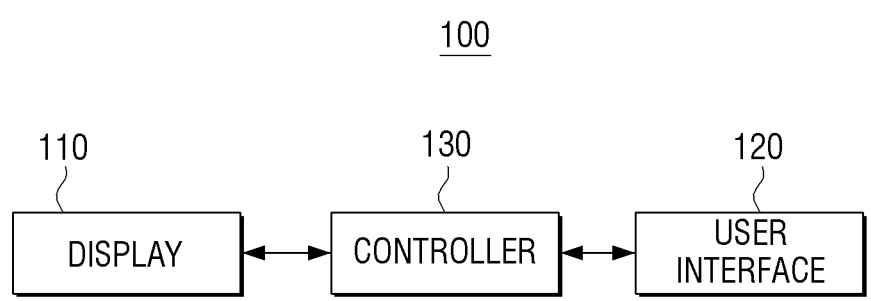
FIGS. 2A and 2B are block diagrams of a display apparatus according to various exemplary embodiments.

FIG. 2A is a schematic block diagram of a display apparatus according to an exemplary embodiment. Referring to FIG. 2A, the display apparatus 100 includes a display 110, a user interface 120, and a controller 130.

The display 110 displays a UI screen. The UI screen may include an application implementation screen including a variety of contents, a web browser screen, or a graphic user interface (GUI).

In one embodiment, the display 110 may be implemented as a liquid crystal display (LCD) panel or organic light emitting diode (OLED) panel, but not limited thereto. In another embodiment, the display 110 may be implemented as a flexible display or a transparent display.

The display 110 may display a character input UI, when a preset event for character input is generated. The preset event may include, for example, a user's request for search or data input. The character input UI may be a UI that includes a plurality of character items and a plurality of function items (e.g., enter, space), and may be implemented as a virtual keyboard.

The user interface 120 may receive a variety of user's requests. The user interface 120 may be implemented as a variety of forms, depending on how the display apparatus 100 is implemented. When the display apparatus 100 is implemented as a digital TV, the user interface 120 may be implemented as a remote control receiver which receives a remote control signal from the remote control apparatus 200, a camera which detects a user motion, or a microphone which receives a user's voice. Further, when the display apparatus 100 is implemented as a touch-based portable terminal, the user interface 120 may be implemented as a touch screen which may have an inter-layered structure with a touch pad. In one embodiment, the user interface 110 may also be used as the display 110.

When the character input UI, including a plurality of character items, is displayed, the user interface 120 may receive a user's request to select a character item from among the plurality of character items.

The controller 130 controls an overall operation of the display apparatus 100 in accordance with the user's request input through the user interface 120.

The controller 130 may determine a character input mode between a mode for inputting a recommended character (hereinafter, "a recommended character input mode") and a mode for inputting character with an accent mark (hereinafter, "accent mark character input mode"), based on the user's request, and provide the corresponding character input UI in accordance with the determined character input mode.

For example, when a specific character is successively input a preset number of times or more within a preset time period, the controller 130 determines the recommended character input mode. When a specific character is input less than the preset number of times within the preset time period, the controller 130 may determine the accent mark character input mode.

Depending on embodiments, the character input mode may be determined in an opposite manner. That is, the controller 130 may determine the accent mark character input mode when a specific character is successively input a preset number of times or more within a preset time period and determine the recommended character input mode when the specific character is input less than the preset number of times within the preset time period.

In an alternative embodiment, the controller 130 may determine the accent mark character input mode when a specific character is pressed longer than a preset time period, while determining the recommended character input mode when the specific character is pressed shorter than the preset time period.

Further, in an alternative embodiment, the controller 130 may determine the character input mode based on characteristics of a selected character item and an event of pressing the character item.

By way of example, for a character that supports use of accent marks, the controller 130 may determine the accent mark character input mode in response to a manipulation of pressing the corresponding character item once, and for a character that does not support the use of the accent marks, the controller 130 may determine the recommended character input mode in response to a manipulation of pressing the corresponding character item once.

As explained above, the character input mode may be determined in various manners.

When the character input mode is determined, the controller 130 may control such that according to the determined character input mode, a first character input UI including recommended character items or a second character input UI including accent mark character items is displayed on an edge area of a character item that corresponds to a specific character. For example, for a character that supports the use of the accent marks, the controller 130 may provide the character input UI including accent mark character items around the corresponding character item, in response to a manipulation of pressing the corresponding character item once.

The first and second character input UIs may be displayed in a manner of partially overlapping character items arranged around the selected character item. Alternatively, the first and second character input UIs may be displayed in a certain area which is separate from the character items arranged around the selected character item.

Further, when the number of recommended characters or accent mark characters that correspond to a specific character in the character input UI displayed in each character input mode is less than a preset number of characters that can be displayed on the character input UI, the controller 130 may control such that the first character input UI or the second character input UI may include at least one accent mark character or recommended character to be displayed. For example, when the number of accent mark characters provided in the accent mark character input mode is less than a preset number of character items displayable on the character input UI, the controller 130 may control such that the recommended characters may be displayed in an area other than the character input UI.

Further, the controller 130 may combine the character items provided in respective character input modes to provide the combined character items on the first or second character input UI.

That is, when the number of recommended characters or accent mark characters corresponding to a specific character on the character input UI displayed in respective input modes is less than a preset number of character items that can be displayed on the character input UI, the controller 130 may control such that a GUI may be displayed to indicate that the first or second character input UI each includes an accent mark character or recommended character. For example, when the number of accent mark characters provided in the accent mark character input mode is less than a preset number of character items displayable on the character input UI, the controller 130 may control such that a GUI is displayed to indicate that the recommended characters may be provided in an area other than the character input UI.

Further, when the number of recommended characters or accent mark characters corresponding to a specific character in the respective character input modes is greater than a preset number of character items displayable on the character input UI, the controller 130 may control such that a GUI may be displayed to indicate that the first or second character input UI may additionally include the recommended character or the accent mark characters.

For a character that does not support the use of the accent mark, the controller 130 may determine the character input mode to be the recommended character input mode, regardless of whether a preset event is detected.

Further, when a character item corresponding to a specific character is again selected within a preset time period in the recommended character input mode or the accent mark character input mode, the controller 130 may change the character input mode. For example, when a specific character item is selected once again within a preset time period in the accent mark character input mode, the controller 130 may control such that the mode is changed to the recommended character input mode (or to a normal character mode) and a character input UI that includes recommended character items is displayed. Although it is described above that the character input mode is changed when the specific character is again selected within a preset time period, it should be noted that, in alternative embodiments, the character input mode may be changed in response to an additional input of the specific character regardless of a timing thereof.

When the recommended character item is selected from the first character input UI displayed in the recommended character input mode, the controller 130 may input a recommended character corresponding to the selected recommended character item, next to the specific character. When the accent mark character item is selected from the second character input UI displayed in the accent mark character input mode, the controller 130 may replace the specific character with the accent mark character that corresponds to the selected accent mark character item. Thus, the accent mark character that corresponds to the selected accent mark character item may be input.

In one embodiment, the controller 130 may display a cursor GUI next to the specific character input in the recommended character input mode and input a recommended character that corresponds to the selected recommended character item next to the specific character.

Further, the controller 130 may replace a specific character (or basic character) with a selected accent mark character and input the selected accent mark character, in a state that a block GUI for a specific character is displayed that is input in the accent mark character input mode. That is, the controller 130 may display a block GUI for a specific character input to an input window (not illustrated), to indicate that the accent mark character input mode is activated.

Further, the controller 130 may finish inputting a corresponding basic character when the corresponding basic character item is pressed in a state that the basic character item selected in the accent mark character input mode is highlighted. In one embodiment, the basic character may be continuously displayed on the input window (not illustrated), until an input is made to the character item included in the character input UI, e.g., the basic character or an accent mark character item.

Alternatively, the controller 130 may finish inputting a character that corresponds to a selected basic character item, when no additional input is made within a preset time period since the basic character item is selected. In one embodiment, the controller 130 may automatically change to the recommended character input mode and provide the character input UI, including recommended character items, on the edge area of the basic character item.

Alternatively, the controller may determine that the accent mark character input mode is not activated and finish inputting a character that corresponds to a selected basic character item, when there is no input of the basic character or the accent mark character item within a preset time period after displaying of the character input UI, including the accent mark character items, on the edge area of the basic character item. In one embodiment, the controller 130 may automatically change to the recommended character input mode and display the character input UI that includes recommended character items which may appear adjacent to the basic character item.

Further, the controller 130 may search an accent mark character item and a recommended character item regarding a specific character item using, for example, a dictionary database (DB) (not illustrated) and a user DB stored in a storage (not illustrated), in respective character input modes.

That is, when the character input mode is determined to be the accent mark character input mode, the controller 130 may first provide the accent mark character item that has a higher likelihood of being chosen by the user, by referencing the dictionary DB and user DB stored in the storage.

Further, when the character input mode is determined to be the recommended character input mode, the controller 130 may, by referencing the dictionary DB and user DB stored in the storage, search at least one character that has the highest possibility of being input next to the character included in the specific character item, and display the searched character as the recommended character. By way of example, when "e" is selected from among a plurality of character items, the controller 130 may, by referencing the dictionary DB and user DB, display character items including "a", "d", "t", "1" which are most likely to be input next to "e", as the recommended character items, around the selected character item, "e".

Further, when one or more recommended character items are displayed and at least one recommended character item is selected therefrom, the controller 130 may control the display 120 to display at least one new recommended character item around the at least one currently-selected recommended character item based on a combination of a character corresponding to the previously-selected character item and a character corresponding to the currently-selected recommended character item. For example, when "d" is selected from the recommended character items of "e", the controller 130 may reference the dictionary DB and the user DB and display character items including "u", "i", "o", "t" that have the highest possibility of being input next to "ed", as new recommended character items around the selected character item "d".

When one recommended character item is selected from the one or more recommended character items, the controller 130 may display recommended character items that may be input next to the selected recommended character item around the selected recommended character item on which a select GUI such as focus highlighting is placed. In one embodiment, the recommended character items that are displayed may be those that have the highest possibility of being input next to the selected recommended character item.

After the recommended character item is selected, the controller 130 may move the select GUI such as focus highlighting to a character item that is arranged at a center of the character input UI and display the moved selected GUI, although not limited thereto. In another embodiment, the focus highlighting may be maintained on the selected recommended character item even after the recommended character item is selected.

Further, the controller 130 may apply the above-explained operation in the accent mark character input mode.

For example, when one accent mark character item is selected from one or more accent mark character items, the controller 130 may display recommended character items that may be input next to the selected accent mark character item, around the selected accent mark character item. As explained above, the recommended character items that are displayed may be those that have the highest possibility of being input next to the selected accent mark character item.

After the accent mark character item is selected, the controller 130 may move the select GUI such as focus highlighting to a character item that is arranged at a center of the character input UI and display the same, although not limited thereto. In another embodiment, the focus highlighting may be maintained on the selected accent mark character item even after the recommended character item is selected.

Accordingly, the user of the display apparatus 100 may input intended characters with convenience, while minimizing his movement required to input the characters.

Figure 2B:
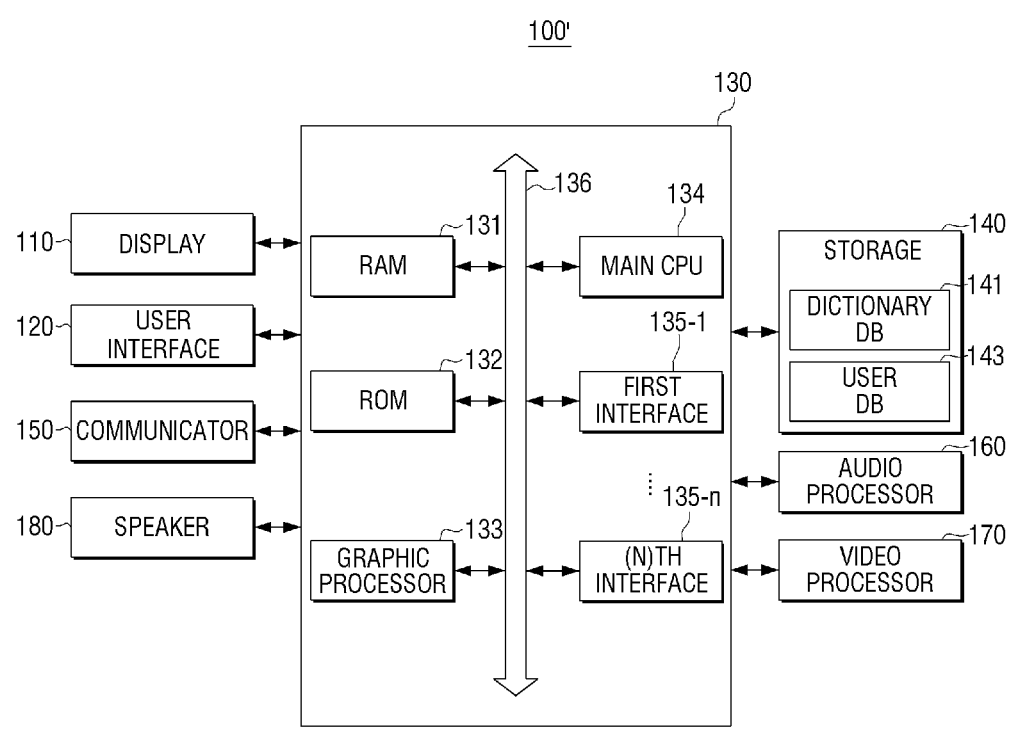

FIG. 2B is a detailed block diagram of a display apparatus according to an embodiment. Referring to FIG. 2B, a display apparatus 100' according to an exemplary embodiment includes a display 110, a user interface 120, a controller 130, a storage 140, a communicator 150, an audio processor 160, a video processor 170 and a speaker 180. The description of like elements will not be explained, but referred to the explanation provided above with reference to FIG. 2A for the sake of brevity.

An image receiver (not illustrated) receives image data through a variety of sources. For example, the image receiver may receive broadcast data from an external broadcasting station, or receive image data from an external device (e.g., digital versatile disc (DVD), Blu-ray (BD) player, etc.)

The storage 140 stores a variety of modules to drive the display apparatus 100. For example, the storage 140 may store software that may execute a base module (not illustrated), a sensing module (not illustrated), a communication module (not illustrated), a presentation module (not illustrated), a web browser module (not illustrated), or a service module (not illustrated). The term 'base module' as used herein refers to a module that processes a signal transmitted from each hardware included in the display apparatus 100 and transmits the same to an upper layer module. The term 'sensing module' as used herein refers to a module that collects information from respective sensors and analyzes and manages the collected information. The sensing module may include, for example, a facial recognition module, a voice recognition module, a motion recognition module, or a near field communication (NFC) recognition module. The term 'presentation module' as used herein refers to a module provided to construct a display screen, and may include a multimedia module to playback and output multimedia contents, or a UI rendering module to perform UI and graphic processing. The term 'communication module' as used herein refers to a module to perform communication with external devices. The term 'web browser module' as used herein refers to a module which accesses web server by web browsing. The term 'service module' as used herein refers to a module that includes applications to provide a variety of services.

The storage 140 stores a dictionary DB 141 and a user DB 143 to provide the accent mark character or the recommended character to the user. That is, the dictionary DB 141 records therein words with general definitions and accent mark character which are supportable by respective characters. The user DB 143 records therein information about words used by the user, or accent mark characters used by the user within a preset period of time. Further, the dictionary DB 141 may store accent mark character information about characters that support use of accent mark characters.

In one embodiment, the dictionary DB 141 and the user DB 143 may be stored in the storage 140, but not limited thereto. Accordingly, the dictionary DB and the user DB may be stored in an external device (e.g., external server) connected via network.

The communicator 150 is configured to communicate with a variety of types of external devices or an external server, according to a variety of types of communication methods. The communicator 150 may include, for example, a WiFi chip, a Bluetooth chip, an NFC chip, a wireless communication chip, or other chips of various forms. The WiFi chip, the Bluetooth chip, and the NFC chip may be used for communication using WiFi communication, Bluetooth communication, and NFC communication, respectively. The NFC chip may utilize a frequency band such as 13.56 MHz among various frequency bands of radio frequency identification (RF-ID) including 135 k Hz, 13.56 MHz, 433 MHz, 860-960 MHz, and 2.45 GHz. The wireless communication chip may communicate according to a variety of communication specifications including, for example, IEEE, ZigBee, 3rd Generation (3G), 3rd Generation Partnership Project (3GPP), or Long Term Evolution (LTE).

The audio processor 160 is provided to process audio data. The audio processor 160 may perform processing such as, for example, audio data decoding, amplification, noise filtering, or many others.

The video processor 170 is provided to process image data received at the image receiver (not illustrated). The video processor 170 may perform image processing such as, for example, image data decoding, scaling, noise filtering, frame rate conversion, resolution conversion, or other processing.

The speaker 180 is provided to output audio data that are processed by the audio processor 160. Additionally, the speaker 180 may output, for example, alarm sounds or voice messages.

The controller 130 controls an overall operation of the display apparatus 100', using programs stored in the storage 140.

Referring to FIG. 2B, the controller 130 may include a random access memory (RAM) 131, a read only memory (ROM) 132, a graphic processor 133, a main central processing unit (CPU) 134, first to (n)th interfaces 135-1~135-n, and a bus 136. The RAM 131, the ROM 132, the graphic processor 133, the main CPU 134, and the first to the (n)th interfaces 135-1~135-n may be connected to one another via the bus 136.

The ROM 132 stores a set of commands for booting a system. When power is supplied in response to a turn-on command, the main CPU 134 copies operating system (O/S) stored in the storage 140 onto the RAM 131 in accordance with the command stored in the ROM 132, and boots up the system by executing the O/S. When booting is completed, the main CPU 134 copies application programs stored in the storage 140 onto the RAM 131, and perform corresponding operations by executing the application programs copied to the RAM 131.

The graphic processor 133 generates a screen that includes objects such as icons, images, or texts, using an operator (not illustrated) and a renderer (not illustrated). The operator computes attribute values such as coordinates, geometry, a size or a color of respective objects to be displayed according to a screen layout, by using a control command received via the user interface 120. The renderer generates screens of various layouts including objects, based on the attribute values computed by the operator. The screen generated by the renderer is displayed within a display area of the display 110.

The main CPU 134 accesses the storage 140 and performs booting, using the O/S stored in the storage 140. The main CPU 134 performs a variety of operations, using the programs, contents, or data stored in the storage 140.

The first to the (n)th interfaces 135-1~135-n are connected to the components explained above. The first to (n)th interfaces may include a network interface which is connected to an external device via network.

When the display 110 displays the character input UI that includes a plurality of character items and a user command is input through the user interface 120, directing to select a first character item from among the plurality of character items, the controller 130 may determine the character input mode based on the user command and display the character input UI that corresponds to the character input mode. The character input UI may be a virtual keyboard, and the character item may comprise a key edge area of a preset shape (e.g., rectangle, circle) enclosing the key, and a character (e.g., alphabet, number) enclosed in the key edge area.

Figure 3:
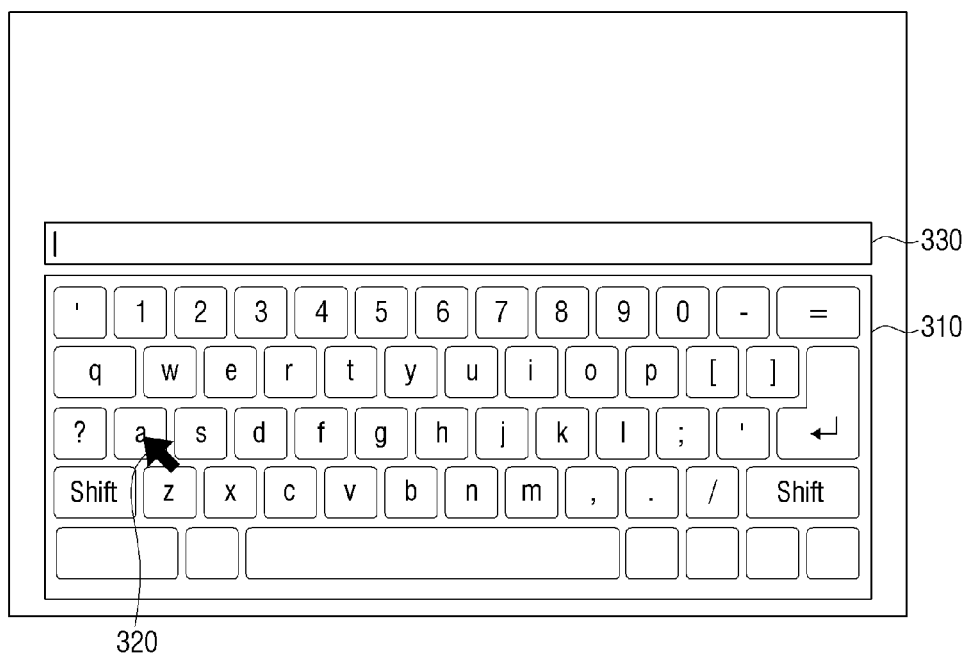
FIGS. 3, 4A and 4B are views for explaining a user interface (UI) providing method according to an exemplary embodiment.
Figure 4A:
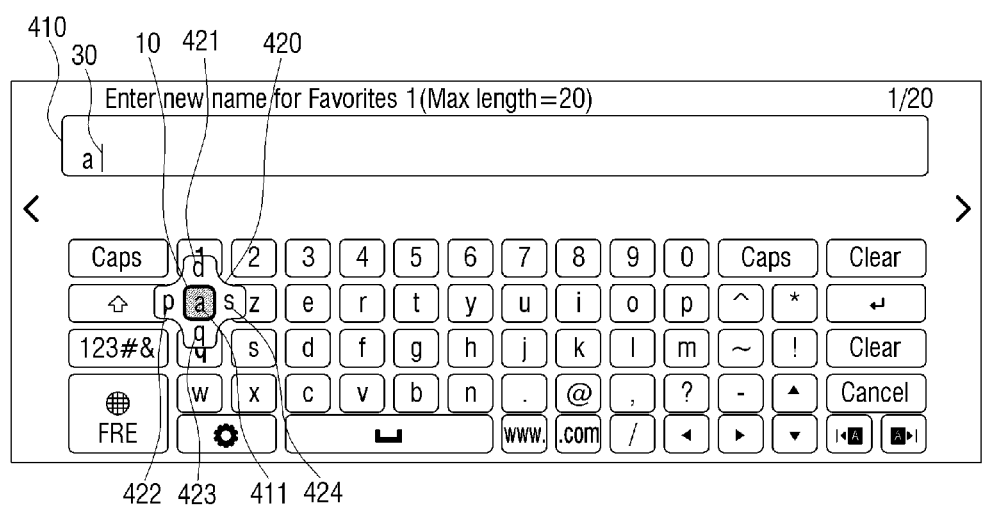
Figure 4B:
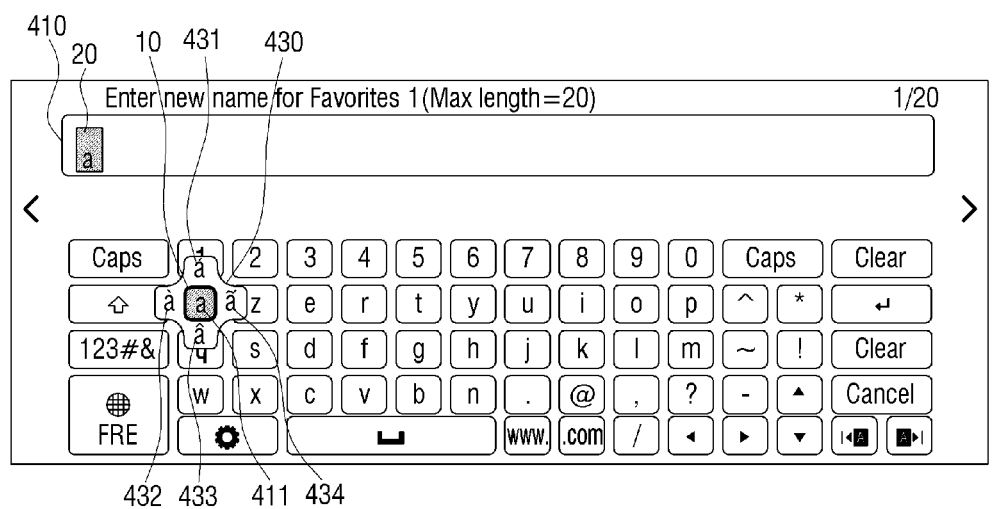

FIGS. 3, 4A and 4B are views for explaining a user interface (UI) providing method according to an exemplary embodiment. Referring to FIGS. 3, 4A and 4B, a character input UI 310, a pointer 320, and a character input window 330 are displayed, and when a user command is received via the user interface 120, directing to select a character item "a" 411, the controller 130 determines the recommended character input mode or the accent mark character input mode, based on the received user command.

When the character input mode is determined to be the recommended character input mode, referring to FIG. 4A, a character input UI 420 including recommended character items 421, 422, 423, 424 may be displayed. In this case, the controller 130 may search a recommended character item for the character item "a", by referencing the dictionary DB 141 and the user DB 143 stored in the storage 140. For example, the controller 130 may search at least one recommended character item for the character item "a", based on at least one character that has the highest possibility of being input next to the character item "a". For example, using the dictionary DB 141 and the user DB 143, the controller 130 may determine character items "d", "p", "s", "c" as the recommended character item for the character item "a". In this case, the controller 130 may determine a position where the recommended character items are arranged, according to a priority thereof, i.e., in the order of a higher possibility of being input next to the character item "a".

When the character input mode is determined to be the accent mark character input mode, referring to FIG. 4B, a character input UI 430 including accent mark characters 431, 432, 433, 434 may be displayed. Using the dictionary DB 141, the controller 130 may search an accent mark character that corresponds to input character item "a" 411. When there exist accent mark characters more than a predetermined number that can be provided on the character input UI, the accent mark characters with a higher possibility of being selected may be searched up to the predetermined number and displayed. Further, the controller 130 may determine a position where the accent mark character items are arranged, according to a priority thereof, i.e., in the order of a higher possibility of being selected.

As illustrated in FIG. 4B, around the character item 411 which is selected in the accent mark character input mode, a select GUI 10 may be displayed, and the character "a" that corresponds to the character item 411 selected in an input window 410 may be processed with a block GUI 20. By doing so, a user may be notified that the accent mark character input mode is activated and the input character "a" can be replaced with the selected accent mark character.

Figure 5A:
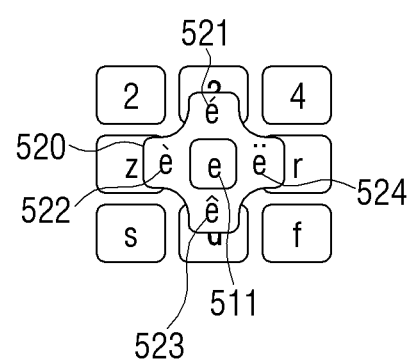
FIGS. 5A to 5C are views for explaining a form of a character input UI, according to various exemplary embodiments.
Figure 5B:
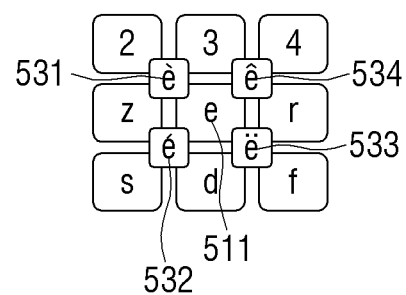
Figure 5C:
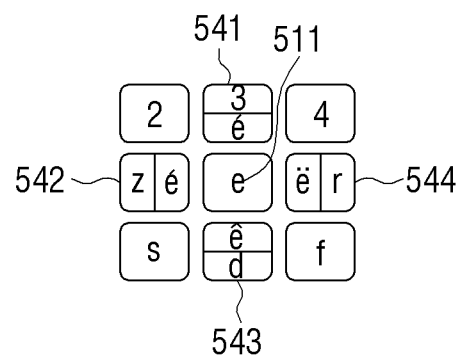

FIGS. 5A to 5C are views for explaining forms of a character input UI according to various exemplary embodiments.

Referring to FIGS. 5A to 5C, the character input UI may be displayed in a variety of forms. It is assumed hereinbelow that the accent mark character input mode is activated, for convenience of explanation.

In one embodiment, the character input UI may be overlapped with a character item which is arranged adjacent to the selected character item 511.

That is, referring to FIG. 5A, the character input UI 520 may be formed such that accent mark character items 521 to 524 are arranged in upper, lower, left and right areas of the selected character item 511 and are thus overlapped with character items adjacent to the selected character item 511. Depending on embodiments, the accent mark character items on upper, lower, left and right areas may be arranged to have a certain interval therebetween. In this exemplary embodiment, it is described that the selected character item 511 is included in the character input UI 520. However, it should be noted that the character input UI 520 may be formed such that the selected character item 522 is not included in the character input UI 520. That is, the character input UI 520 may be formed to provide the accent mark character items 521 to 524 separate from the selected character item.

Referring to FIG. 5B, the character input UI may be formed such that the accent mark character items 531 to 534 are arranged in upper-left, upper-right, lower-left and lower-right areas of the selected character item 511. As shown in FIG. 5B, the accent mark character items 531 are formed to have certain intervals therebetween.

Referring to FIG. 5C, the character input UI may be formed such that the accent mark character items 541 to 544 share a portion of areas of the character items which are arranged around the selected character item 511.

That is, referring to FIG. 5C, the character input UI may share a portion of the areas of the character items "3", "r", "d", and "z" arranged on the upper, lower, left and right areas of the selected character item 511.

Figure 6A:
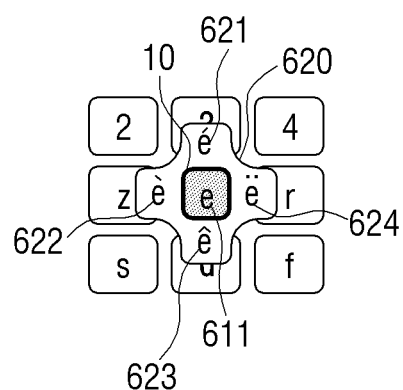
FIGS. 6A to 6C are views for explaining a method for inputting a character with an accent mark according to an exemplary embodiment.
Figure 6B:
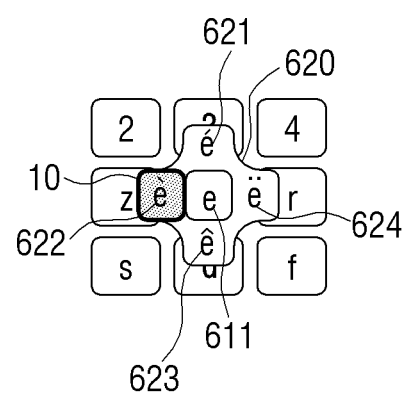
Figure 6C:
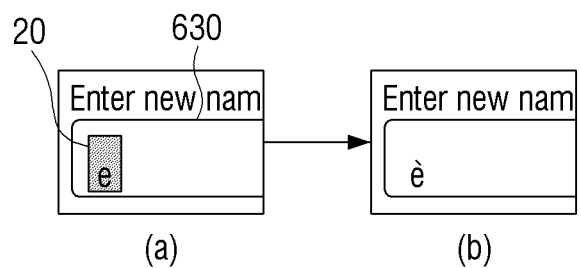

FIGS. 6A to 6C are views for explaining a method for inputting accent mark character according to an exemplary embodiment.

Referring to FIG. 6A, when a specific character item "e" is selected, a character input UI 620 including the specific character item 611 and accent mark character items 621 to 624 corresponding to the selected character item 611 are displayed, and a select GUI 10 is placed on the selected character item 611.

Referring to FIGS. 6B and 6C, the select GUI 10 may be moved in response to a user command and placed on the accent mark character item 622 among the accent mark character items 621 to 624. While the specific character item 611 is selected and the select GUI 10 is placed on the character input UI 620, the character that corresponds to the specific character item 611 may be processed and displayed with the block GUI 20 in an input window 630.

Next, when the accent mark character item 622 on which the select GUI 10 is placed is selected, referring to FIG. 6C(b), the character item "e" with the block GUI 20 in the input window 630 is replaced with the selected accent mark character item 622 to be displayed.

Figure 7:
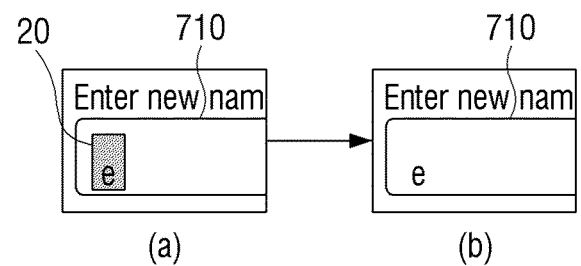
FIG. 7 is a view for explaining a method for cancelling an accent mark character input mode according to an exemplary embodiment.

FIG. 7 is a view for explaining a method for cancelling an accent mark character input mode according to an exemplary embodiment.

Depending on embodiments, the accent mark character input mode may be cancelled, when an accent mark character is selected from the accent mark characters provided on the character input UI, or when the select GUI is removed from the character input UI. For example, referring to FIG. 6C, the accent mark character input mode may be cancelled when the accent mark character item 622 is selected.

Further, when the select GUI is removed from the character input UI area that includes an accent mark character item in a state that the accent mark character is not selected, referring to FIG. 7(b), the block GUI 20 in an input window 710 is removed, and one of the plurality of inputs to enter the accent mark character input mode is considered valid, so that the corresponding character is maintained in the input window 710.

Figure 8:
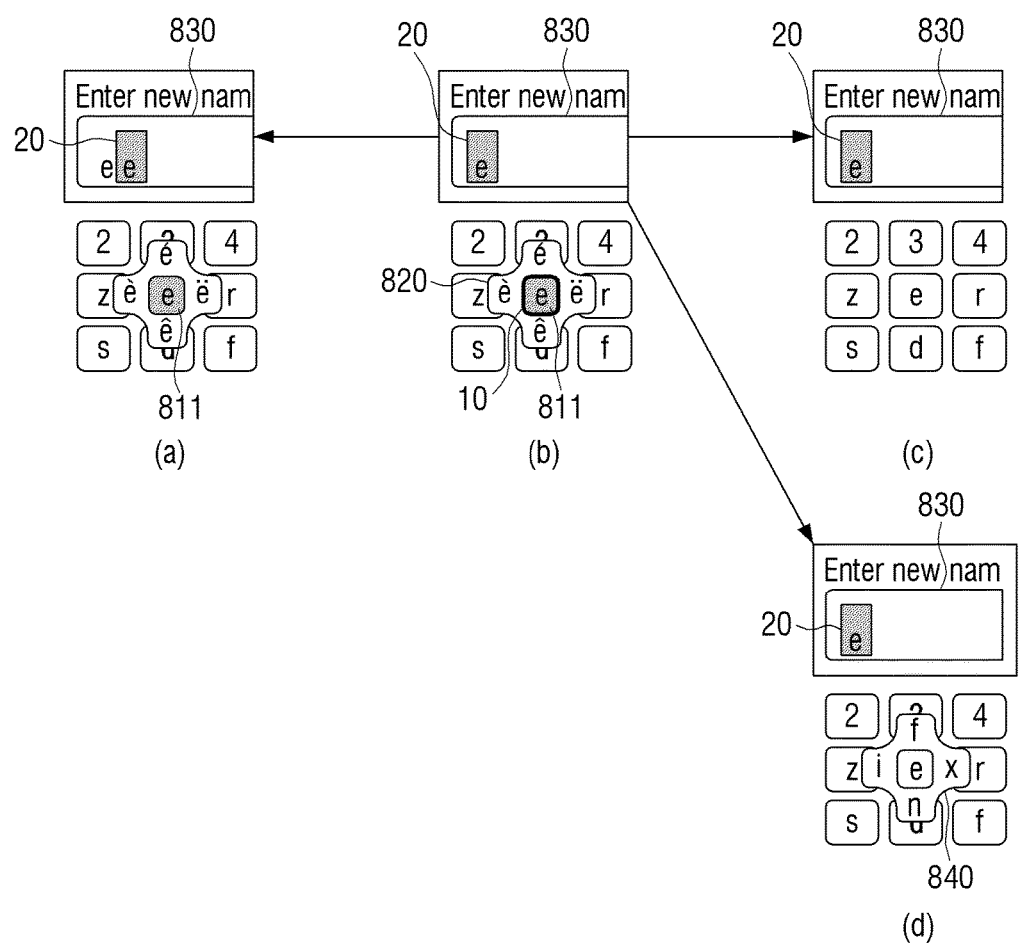
FIG. 8 is a view for explaining a method for shifting between input modes according to an exemplary embodiment.

FIG. 8 is a view for explaining a method for changing an input mode according to an exemplary embodiment.

Referring to FIG. 8(b), it is assumed that a corresponding character input UI 820 is displayed in the accent mark character input mode, and character "e" corresponding to a selected character item 811 is processed and displayed with the block GUI 20 in an input window 830.

When the selected character item 811 is selected once again within a preset time period after the last input thereof to enter the accent mark character input mode, the input mode may be changed to a normal character input mode. In the normal character input mode, the character input UI 820 is removed, as illustrated in FIG. 8(c). That is, the input mode may be changed in a toggling manner, depending on whether successive inputs are received within a preset time period. However, even when changing modes, the block GUI 20 may be maintained in the input window 830 to indicate that the accent mark character input is not yet deactivated.

Depending on embodiments, referring to FIG. 8(d), when the accent mark character input mode is cancelled, the input mode may change to the recommended character input mode which provides corresponding recommended character items.

When no successive input of the selected character item 811 is received within the preset time period after the last input thereof to enter the accent mark character input mode, a character that corresponds to the selected character item 811 is confirmed and input. Next, a newly-input character may cancel the accent mark character input mode. For example, referring to FIG. 8(a), when a user presses the selected character item 811 once again after a preset time period in the accent mark character input mode, the accent mark character input is cancelled, and the character "e" that corresponds to the selected character item 811 is confirmed. Next, input the new character "e" may be processed with the block GUI 20 and input next to the character "e" which is previously confirmed and input to the input window 830.

Figure 9A:
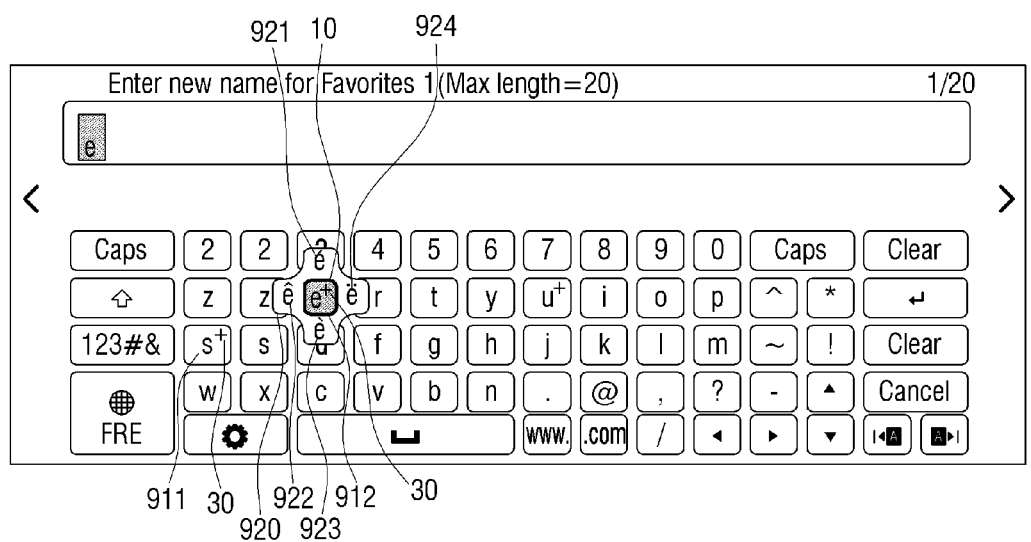
FIGS. 9A to 9C are views for explaining forms of character input UIs according to various exemplary embodiments.
Figure 9B:
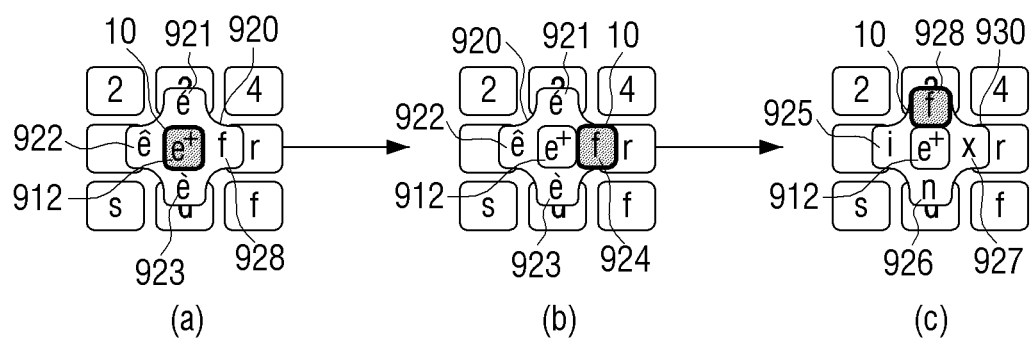
Figure 9C:
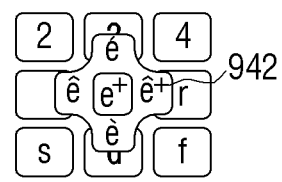

FIGS. 9A to 9C are views for explaining forms of a character input UI according to various exemplary embodiments.

Referring to FIG. 9A, a GUI 30 may be displayed on character items 911, 912 supporting an accent mark character on a virtual keyboard, to indicate the accent mark character is supported. Also, the select GUI 10 is placed on the selected character item 911 and a character input UI 920 including accent mark characters 921, 922, 923, and 924 are displayed around the select GUI 10.

Further, as illustrated in FIG. 9C, when the character input UI 920 corresponding to the accent mark character input mode is provided, a GUI 942 may be displayed to indicate that there are more accent mark characters than a predetermined number (e.g., 4) of accent mark characters that can be provided on the accent mark character input UI 920. Accordingly, when the corresponding GUI 942 is selected, at least one of currently-provided accent mark character items may be replaced with a next accent mark character item to be displayed. In this case, according to one embodiment, when still more accent mark characters exist, the GUI 42 may continuously be displayed.

Depending on embodiments, by referring to FIG. 9C, the GUI 42 which indicates presence of additional accent mark characters may be displayed along with a specific accent mark character item.

Further, referring to FIG. 9B, when the character input UI 920 corresponding to the accent mark character input mode is provided and the number of the accent mark characters that can be provided on the character input UI 920 is less than a predetermined number (e.g., 4), a recommended character item 928 may be provided on an item display area. In one embodiment, when the corresponding recommended character item 928 is selected through the select GUI 10, the character input UI 920 is changed to a character input UI 930 in which recommended character items 925 to 928 are displayed.

Figure 10:
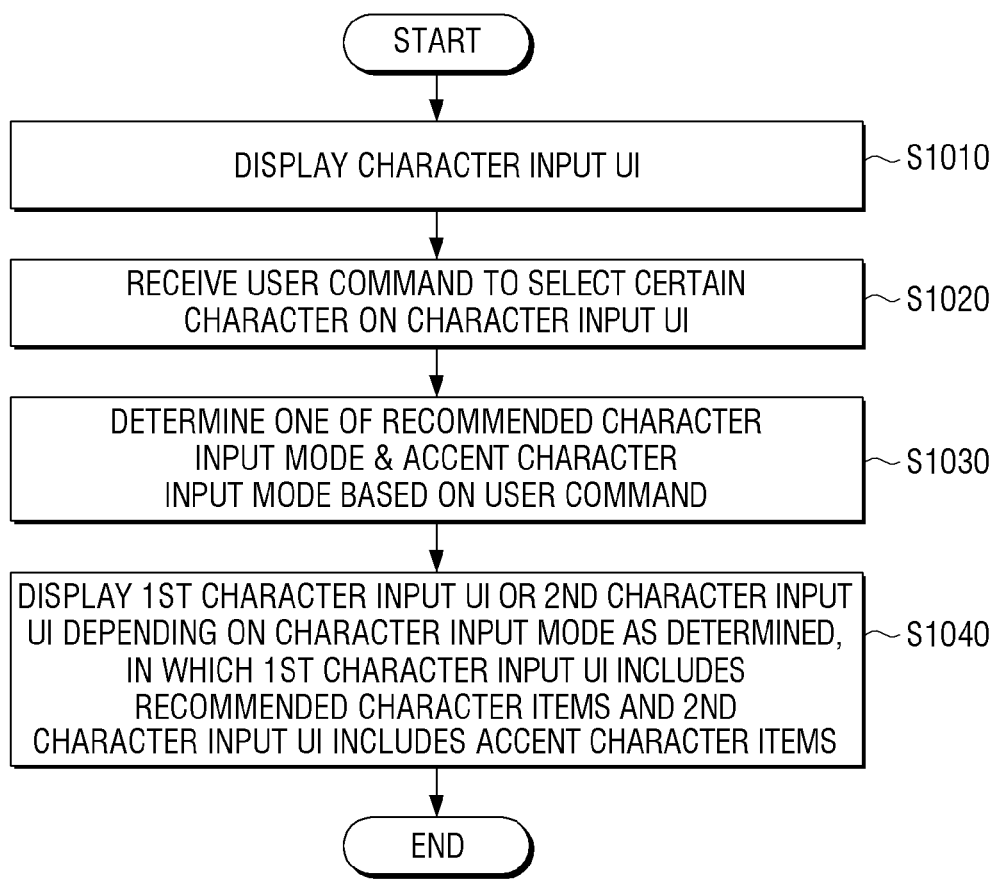
FIG. 10 is a flowchart illustrating a character input UI providing method according to an exemplary embodiment.

FIG. 10 is a flowchart illustrating a method for providing a character input UI according to an exemplary embodiment.

According to a UI providing method according to an exemplary embodiment, at S1010, the character input UI is displayed. The character input UI may be displayed when a preset event to input a character is generated.

At S1020, a user command to select a specific character is received on the character input UI, and at S1030, one of the recommended character input mode and the accent mark character input mode is determined based on the received user command.

Next, at S1040, a first character input UI, including recommended character items that correspond to a specific character, or a second character input UI, including the accent mark character items, may be displayed depending on the character input mode as determined.

At S1030, the character input mode may be determined as the recommended character input mode when the user command is input by a predetermined number of successive inputs for a specific character within a preset time, or determined as the accent mark character input mode when the user command is input by less than a predetermined number of inputs for a specific character within a preset time period.

Further, when the recommended character item is selected from the first character input UI displayed in the recommended character input mode, the recommended character that corresponds to the selected recommended character item is input next to the specific character. When the accent mark character item is selected from the second character input UI displayed in the accent mark character input mode, the specific character may be replaced with an accent mark character that corresponds to the selected accent mark character item and input. In the accent mark character input mode, the block GUI may be displayed on the specific character that is input in the input window to indicate that the accent mark character input mode is activated. When the accent mark character item is selected in a state that the block GUI is displayed, the input specific character may be replaced with the selected accent mark character and input.

In the recommended character input mode, an input of a specific input character may be confirmed and a cursor GUI may be displayed next to the specific character input in the input window.

At S1040, the character input UI may be the first or the second character input UI, including at least one accent mark character or recommended character, when the number of recommended characters or accent mark characters corresponding to the specific character in the character input UI displayed in each character input mode is less than a preset number of items that can be displayed on the character input UI.

Further, at S1040, the character input UI may include a GUI to indicate that additional recommended characters or accent characters may be further provided on the first or second character input UI, when the number of the recommended characters or accent mark characters corresponding to the specific character selected in each character input mode is greater than a preset number of items that can be displayed in the character input UI.

Further, at S1030, the character input mode may be determined as the recommended character input mode, irrespective of a type of a user command, when the specific character does not support use of accent marks.

To allow a user to select recommended characters or accent characters arranged near the specific character item on the first or the second character input UIs, the first and second character input UIs may be displayed in a manner of partially overlapping character items arranged near the specific character item.

Further, when a character item corresponding to the specific character is additionally selected within a preset time period in the recommended character input mode or the accent mark character input mode, the character input mode may be changed.

Further, at S1040, the recommended character for a specific character may be searched based on at least one character that has the highest possibility of being input next to the character included in the specific character item, using the dictionary DB and the user DB which records information about record of words used, and the searched recommended character may be displayed.

In various exemplary embodiments, a user is provided with a variety of character input modes and corresponding character input UIs, which can be simply manipulated. Further, the user is enabled to input intended accent mark characters with reduced (or minimized) manipulations. Therefore, a substantially efficient and effective input of the accent mark character may become possible.

The method for providing a UI of a display apparatus according to various exemplary embodiments may be implemented as a computer program and provided on a display apparatus.

For example, a non-transitory computer readable medium may be provided, storing therein a program for enabling a computer to perform: when a user command to select a specific character is input on the character input UI, determining one of the recommended character input mode and the accent mark character input mode; and depending on the determined character input mode, providing a first character input UI or a second character input UI, in which the first character input UI includes recommended character items and the second character input UI includes accent mark character items.

The term 'non-transitory readable medium' as used herein refers to a medium configured to semi-permanently store data and enable reading by a device, rather than a medium that stores data for a relatively brief period of time, such as register, cache, or memory. For example, the non-transitory readable medium may include, for example, a CD, a DVD, a hard disc, a Blu-ray disc, a universal serial bus (USB), a memory card or a ROM.

The foregoing exemplary embodiments and advantages are merely exemplary and are not to be construed as limiting. The present teaching can be readily applied to other types of apparatuses. Also, the description of the exemplary embodiments of the present inventive concept is intended to be illustrative, not to limit the scope of the claims, and many alternatives, modifications, and variations will be apparent to those skilled in the art.

What is claimed is:

1. A method for providing a user interface (UI), the method comprising:
    displaying a character input UI;
    receiving a command to select a specific character on the character input UI;
    selecting, based on receiving the command, one of a recommended character input mode, which displays a first character input UI, and an accent mark character input mode, which displays a second character input UI; and
    displaying the first character input UI or the second character input UI according to a selected character input mode,
    wherein the selecting the one of the recommended character input mode and the accent mark character input mode is based on at least one of a number of inputs of the specific character within a first predetermined time period, a time period during which the specific character is pressed, and characteristics of the specific character, and
    wherein the first character input UI comprises recommended character items that are not displayed in the second character input UI, each of the recommended character items comprising a predicted character to be input next to the selected specific character, and the second character input UI comprises accent mark character items that are not displayed in the first character input UI, each of the accent mark character items comprising a possible accent mark character to replace the selected specific character,
    wherein the method further comprises:
        based on a character item corresponding to the specific character being selected within a second predetermined time period after displaying the first character input UI, changing the recommended character input mode to the accent mark character input mode and displaying the second character input UI, and
        based on the character item corresponding to the specific character being selected within the second predetermined time period after displaying the second character input UI, changing the accent mark character input mode to the recommended character input mode and displaying the first character input UI.

2. The method of claim 1, wherein the recommended character input mode is selected based on receiving the command to select the specific character at least a preset number of times or more within the first predetermined time period, and the accent mark character input mode is selected based on receiving the command to select the specific character less than the preset number of times within the first predetermined time period.

3. The method of claim 1, further comprising displaying a block graphic user interface (GUI) on the specific character input to an input window in the accent mark character input mode and with the block GUI being displayed, inputting the possible accent mark character that corresponds to a selected accent mark character item by replacing the specific character with the possible accent mark character.

4. The method of claim 1, wherein the displaying the one of the first character input UI or the second character input UI comprises, based on a number of recommended characters or accent mark characters that correspond to the specific character being equal to or less than a preset number of items displayable on the first or the second character input UI, displaying one or more accent mark character items in the first character input UI or displaying one or more recommended character items in the second character input UI.

5. The method of claim 1, wherein the displaying the first character input UI or the second character input UI comprises:
    based on a number of recommended characters or accent mark characters that correspond to the specific character being greater than a preset number of items displayable on the first or the second character input UI, displaying a GUI indicating that at least one additional recommended character or at least one additional accent mark character is not displayed in the first or the second character input UI.

6. The method of claim 1, wherein the selecting comprises, based on the specific character not supporting use of an accent mark, selecting the recommended character input mode, irrespective of a number of times the command is received within the first predetermined time period.

7. The method of claim 1, wherein the displaying the at least one of the first character input UI and the second character input UI comprises:
    displaying the at least one of the first character input UI and the second character input UI to partially overlap with character items that are arranged adjacent to the character item corresponding to the specific character.

8. The method of claim 1, further comprising, based on the specific character being again selected in the recommended character input mode, changing the recommended character input mode to the accent mark character input mode, and based on the specific character being again selected in the accent mark character input mode, changing the accent mark character input mode to the recommended character input mode.

9. The method of claim 1, wherein the displaying the one of the first character input UI and the second character input UI comprises searching at least one recommended character or at least one accent mark character based on a possibility of being input next to the specific character using a dictionary database and a user database storing therein a record of words previously used by a user, and displaying the at least one recommended character or the at least one accent mark character.

10. A display apparatus comprising:
    a display configured to display a character input user interface (UI);
    a user interface configured to receive a command to select a specific character on the character input UI; and
    a processor configured to:
        select, based on receiving the command, one of a recommended character input mode, which displays a first character input UI, and an accent mark character input mode, which displays a second character input UI; and control the display to display the first character input UI or the second character input UI according to a selected character input mode, wherein the selecting the one of the recommended character input mode and the accent mark character input mode is based on at least one of a number of inputs of the specific character within a first predetermined time period, a time period during which the specific character is pressed, and characteristics of the specific character, and wherein the first character input UI comprises recommended character items that are not displayed in the second character input UI, each of the recommended character items comprising a predicted character to be input next to the selected specific character, and the second character input UI comprises accent mark character items that are not displayed in the first character input UI, each of the accent mark character items comprising a possible accent mark character to replace the selected specific character, wherein the processor is further configured to:

based on a character item corresponding to the specific character being selected within a second predetermined time period after displaying the first character input UI, change the recommended character input mode to the accent mark character input mode and displaying the second character input UI, and based on the character item corresponding to the specific character being selected within the second predetermined time period after displaying the second character input UI, change the accent mark character input mode to the recommended character input mode and displaying the first character input UI.

11. The display apparatus of claim 10, wherein the processor is configured to select the recommended character input mode based on receiving the command to select the specific character at least a preset number of times or more within the first predetermined time period and select the accent mark character input mode based on receiving the command to select the specific character less than the preset number of times within the first predetermined time period.

12. The display apparatus of claim 10, wherein the processor is configured to control the display to display a block graphic user interface (GUI) on the specific character input to an input window in the accent mark character input mode and with the block GUI being displayed, input the possible accent mark character that corresponds to a selected accent mark character item by replacing the specific character with the possible accent mark character.

13. The display apparatus of claim 10, wherein the processor is configured to, based on a number of recommended characters or accent mark characters that correspond to the specific character being equal to or less than a preset number of items displayable on the first or the second character input UI, control the display to display one or more accent mark character items in the first character input UI or display one or more recommended character items in the second character input UI.

14. The display apparatus of claim 10, wherein the processor is configure to, based on a number of recommended characters or accent mark characters that correspond to the specific character being greater than a preset number of items displayable on the first or the second character input UI, control the display to display a GUI indicating that at least one additional recommended character or at least one additional accent mark character is not displayed in the first or the second character input UI.

15. The display apparatus of claim 10, wherein the processor is configured to, based on the specific character not supporting use of an accent mark, select the recommended character input mode, irrespective of a number of times the command is received within the first predetermined time period.

16. The display apparatus of claim 10, wherein the first character input UI and the second character input UI is displayed to partially overlap with character items that are arranged adjacent to the character item corresponding to the specific character.

17. The display apparatus of claim 10, wherein the processor is configured to change the recommended character input mode to the accent mark character input mode based on the specific character being again selected in the recommended character input mode, and configured to change the accent mark character input mode to the recommended character input mode based on the specific character being again selected in the accent mark character input mode.

18. The display apparatus of claim 10, further comprising:
a storage configured to store a dictionary database and a user database, the user database storing therein a record of words previously used by a user,
wherein the processor is configured to search at least one recommended character or at least one accent mark character based on a possibility of being input next to the specific character using the dictionary database and the user database, and control the display to display the at least one recommended character or the at least one accent mark character.

\* \* \* \* \*